US007508788B2

(12) United States Patent
Anjum

(10) Patent No.: US 7,508,788 B2
(45) Date of Patent: Mar. 24, 2009

(54) LOCATION DEPENDENT KEY MANAGEMENT IN SENSOR NETWORKS WITHOUT USING DEPLOYMENT KNOWLEDGE

(75) Inventor: Farooq Anjum, Somerset, NJ (US)

(73) Assignees: Toshiba America Research, Inc, Piscataway, NJ (US); Telcordia Technologies, Inc, Piscataway, NJ (US)

( * ) Notice: Subject to any disclaimer, the term of this patent is extended or adjusted under 35 U.S.C. 154(b) by 146 days.

(21) Appl. No.: 11/683,312

(22) Filed: Mar. 7, 2007

(65) Prior Publication Data

US 2007/0291682 A1    Dec. 20, 2007

Related U.S. Application Data

(60) Provisional application No. 60/804,821, filed on Jun. 14, 2006.

(51) Int. Cl.
*H04Q 7/00* (2006.01)

(52) U.S. Cl. .................. 370/328; 370/354; 370/356; 370/502; 370/522; 713/171

(58) Field of Classification Search .............. 370/328, 370/338, 352, 354, 356, 408, 469, 502, 522; 713/168, 171
See application file for complete search history.

(56) References Cited

U.S. PATENT DOCUMENTS

2007/0171859 A1 * 7/2007 Brahmbhatt et al. ........ 370/328

2008/0089519 A1 * 4/2008 Ekberg ..................... 380/270

OTHER PUBLICATIONS

H.Chan, "Random Key Predistribution Schemes for Sensor Networks". In IEEE Symposium on Security and Privacy, May 2003, p. 1-17, Carnegie Mellon University, USA.
W. Du, "A Pairwise Key Pre-distribution Scheme for Wireless Sensor Networks", In Proceedings of the Tenth ACM Conference on Computer and Communications Security (CCS 2003), Oct. 2003, pp. 1-10, USA.

(Continued)

*Primary Examiner*—Dwayne D Bost
*Assistant Examiner*—Inder P Mehra
(74) *Attorney, Agent, or Firm*—Watchstone P+D, pllc; Stephen B. Parker

(57) ABSTRACT

A system for key management in sensor networks which takes the location of sensor nodes into consideration while deciding the keys to be deployed on each node. This system reduces the number of keys that have to be stored on each sensor node and also provides for the containment of node compromise. Thus compromise of a node in a location affects the communications only around that location. The location dependent key management system does not require any knowledge about the deployment of sensor nodes. The system starts off with the loading of a single key on each sensor node prior to deployment. Subsequent to deployment a plurality of beacons is transmitted a plurality of different transmission ranges from each anchor node, said beacons containing at least one nonce. Each sensor node receives beacons depending upon its location in the network. Thus, sensor nodes in different locations have different nonce sets, and each sensor node derives updated keys using a combination of the common key and its set of nonces. The system allows for additions of sensor nodes to the network at any point in time.

20 Claims, 12 Drawing Sheets

Example illustrating the location based keying scheme

OTHER PUBLICATIONS

W. Du, A Key Management Scheme for Wireless Sensor Networks Using Deployment Knowledge, INFOCOM, Apr. 2004, p. 1-12, USA.

W. Du, "A Pairwise Key Pre-distribution Scheme for Wireless Sensor Networks", ACM Transactions on Information and System Security (TISSEC), 2005, p. 1-31, USA.

L. Lazos, "Serloc: Secure Range-Independent Localization for Wireless Sensor Networks", Proceedings of WISE, Oct. 2004, pp. 1-10, USA.

D. Liu, "Establishing Pairwise Keys in Distributed Sensor Networks", Proceedings of the Tenth ACM Conference on Computer and Communications Security (CCS 2003), Oct. 2003, pp. 1-10, USA.

D. Liu, "Establishing Pairwise Keys in Distributed Sensor Networks", ACM Trans. Inf. Syst. Secur., Oct. 2005, pp. 1-35, vol. 8, USA.

A. Perrig "Spins: Security Protocols for Sensor Networks", Wireless Networks Journal (WINE), Sep. 2002, pp. 1-14, Kluwer Academic Publishers, Netherlands.

S. Capkun, "Secure Positioning of Wireless Devices With Application to Sensor Networks", In IEEE Infocom, Mar. 2005, p. 1-12, Switzerland.

S. Zhu, "Leap: Efficient Security Mechanisms for Large-Scale Distributed Sensor Networks", Proc. Of the 10th ACM Conference on Computer and Communications Security (CCS '03), Oct. 2003, p. 1-14, USA.

International Search Report dated Sep. 11, 2008.

\* cited by examiner

Fig. 1. Example illustrating the location based keying scheme

Fig. 2. Average number of keys

Fig. 3. Effects on connectivity

Fig. 4. Illustrating the behavior of LDK

Fig. 5. Effects of security of non-compromised nodes

Fig. 6. Performance of system as a function of compromised nodes

Fig. 7. Impact of key threshold on connectivity

Fig. 8. Impact of realistic conditions on connectivity

Fig. 9. Impact of realistic condistions on node compromise

Fig. 10. Comparing the performance of LDK with random key scheme

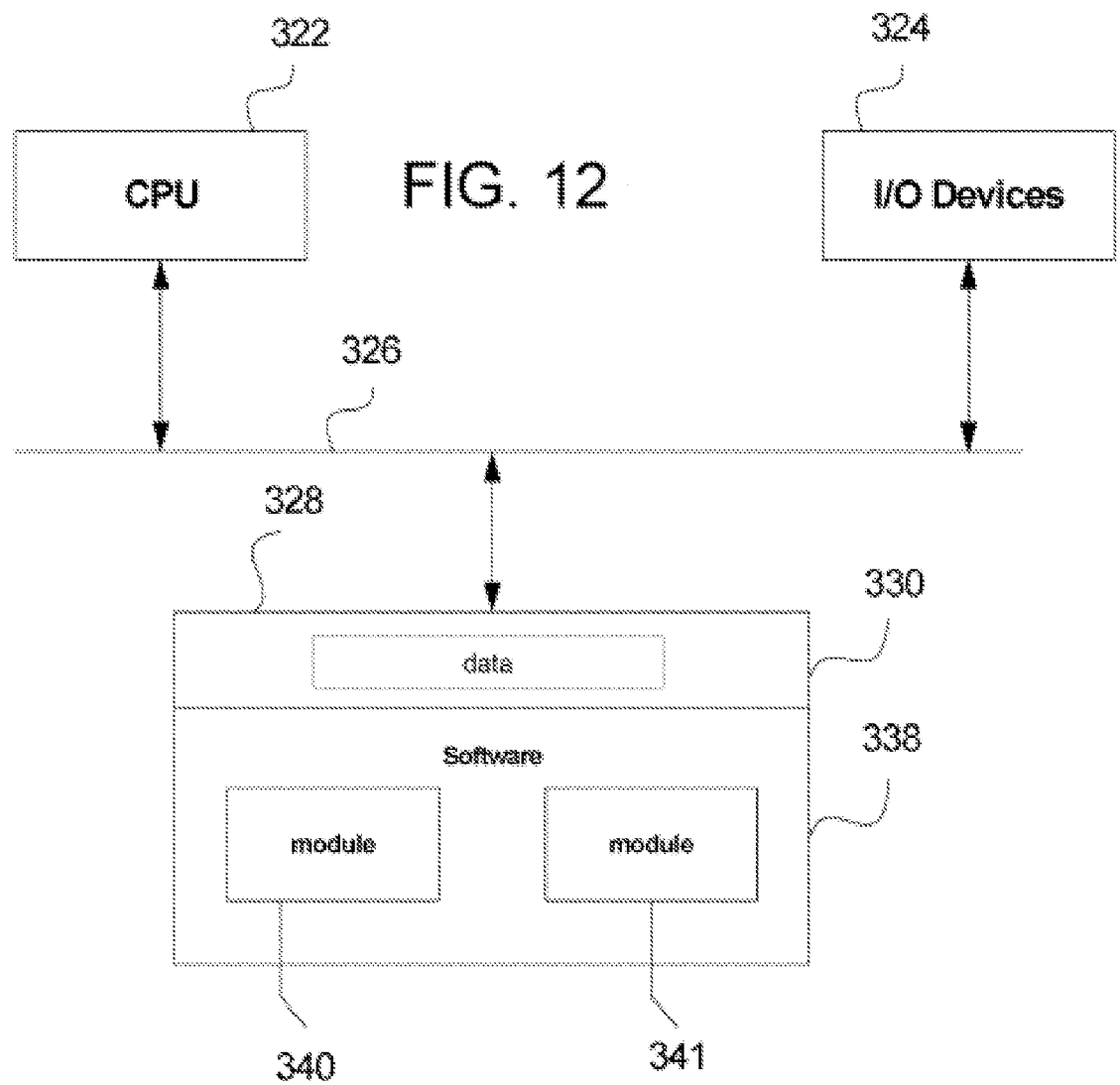

LOCATION DEPENDENT KEY MANAGEMENT IN SENSOR NETWORKS WITHOUT USING DEPLOYMENT KNOWLEDGE

The present application claims priority under 35 U.S.C. 119 to provisional application Ser. No. 60/804,821, filed Jun. 14, 2006, the entire disclosure of which is incorporated herein by reference.

BACKGROUND

1. Field of the Invention

The present application relates to wireless communications and in particular to, inter alia, methods and systems for key management, security, and/or sensor networks and preferred embodiments provide efficient key management in sensor networks which takes location of sensors into consideration.

2. Background Discussion

Networks and Internet Protocol:

There are many types of computer networks, with the Internet having the most notoriety. The internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router, or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address, and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB; RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet. Then the device has to be reconfigured with a new IP address, a proper netmask and a default router. Otherwise, routing protocols would not be able to deliver the packets properly.

Illustrative Background Architecture:

FIG. 11 depicts some illustrative architectural components related to illustrative and non-limiting wireless access points to which client devices communicate. In this regard, FIG. 11 shows an illustrative wireline network 20 connected to a wireless local area network (WLAN) generally designated 21. The WLAN 21 includes an access point (AP) 22 and a number of user stations 23, 24. For example, the wireline network 20 can include the Internet or a corporate data processing network. For example, the access point 22 can be a wireless router, and the user stations 23, 24 can be, e.g., portable computers, personal desk-top computers, PDAs, portable voice-over-IP telephones and/or other devices. The access point 22 has a network interface 25 linked to the wireline network 21, and a wireless transceiver in communication with the user stations 23, 24. For example, the wireless transceiver 26 can include an antenna 27 for radio or microwave frequency communication with the user stations 23, 25. The access point 22 also has a processor 28, a program memory 29, and a random access memory 31. The user station 23 has a wireless transceiver 35 including an antenna 36 for communication with the access point station 22. In a similar fashion, the user station 24 has a wireless transceiver 38 and an antenna 39 for communication to the access point 22. By way of example, in some embodiments an authenticator could be employed within such an access point (AP) and/or a supplicant or peer could be employed within a mobile node or user station.

FIG. 12 shows an illustrative computer or control unit that can be used to implement computerized process steps, to be carried out by devices, such as, e.g., an access point and/or a user station, in some illustrative examples. In some examples, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices, and/or other memory devices. In the various embodiments, the transmission may use any appropriate communications technology.

REFERENCES

The preferred embodiments of the present invention provide a variety of advances and improvements over existing technologies. For background reference, the following references [1] to [12] listed below are incorporated herein by reference in their entireties.

[1] S. Basagni, K. Herrin, D. Bruschi, and F. Rosti. Secure pebblenet. Proceedings of the 2001 ACM international Symposium on Mobile Ad Hoc Networking and Computing MobiHoc, 2001, October 2001.

[2] H. Chan, A. Perrig, and D. Song. Random key predistribution schemes for sensor networks, in IEEE Symposium on Security and Privacy, page 197213, May 2003.

[3] W. Du, J. Deng, Y. Han, and P Varsney. A pairwise key pre distribution system for wireless sensor networks. In In Proceedings of the Tenth ACM Conference on Computer and Communications Security (CCS 2003), pages 42-51, October 2003.

[4] W. Du, J. Deng, Y. S. Han, S. Chen, and P. K. Varshney. A key management scheme for wireless sensor networks using deployment knowledge In INFOCOM, 2004, April 2004.

[5] W. Du, J. Deng, Y. S. Han, P. Varshney, J. Katz, and A. Khalili. A pairwise key pre-distribution system for wireless sensor networks In ACM Transactions on Information and System Security (TISSEC), 2005.

[6] L. Eschenauer and V. Gligor. A key-management scheme for distributed sensor networks, in Proceedings of the 9th ACM conference on Computer and Communications Security, pages 41-47, November 2002.

[7] L. Lazos and R. Poovendran. Serloc: Secure range-independent localization for wireless sensor networks, in Proceedings of WISE, pages 21-30, October 2004.

[8] D. Liu and P. Ning. Establishing pairwise keys in distributed sensor networks, in Proceedings of the Tenth ACM Conference on Computer and Communications Security (CCS 2003), pages 52-61, October 2003.

[9] D. Liu, P Ning, and R. Li. Establishing pairwise keys in distributed sensor networks In ACM Trans. Inf. Syst. Secur., volume 8, pages 41-77, October 2005.

[10] A Perrig, FR. Szewezyk, V. Wen, D. Culler, and J. D. Tygar Spins: Security protocols for sensor networks In Wireless Networks Journal (WINE), September 2002.

[11] S. Capkun and J. P. Hubaux. Secure positioning of wireless devices with application to sensor networks. In In IEEE Infocom, March 2005.

[12] Sencun Zhu, Sanjeev Setia, and Sushil Jajodia. Leap: Efficient security mechanisms for large-scale distributed sensor networks, in Proc. Of the $10^{th}$ ACM Conference on Computer and Communications Security (CCS '03), October 2003.

SUMMARY

The present invention (in some preferred embodiments) improves upon the above and/or other background technologies and/or problems therein.

The present invention (in some preferred embodiments) improves upon key management in sensor networks by taking the location of sensor nodes into consideration while deciding which keys are to be deployed on each node. This system, which is referred to herein as "location dependent key management" (LDK), does not assume any knowledge about the deployment of sensor nodes. As a result, this approach not only reduces the number of keys that have to be stored on each sensor node.

The present invention (in some preferred embodiments) additionally improves upon key management in sensor networks by containing a node compromise to communications around the location of the compromised node. In addition, the present system is low cost in that it starts off with loading a single common key on each sensor node prior to deployment. The actual keys are then derived from this single key once the sensor nodes are deployed.

The present invention (in some preferred embodiments) further improves upon key management in sensor networks by providing a location dependent key management in which keys are allocated to sensor nodes depending on the location of the sensor node after deployment, without requiring any knowledge about the deployment of sensors.

The present system (in some preferred embodiments) additionally improves upon key management in sensor networks by allowing for additions of sensor nodes to the network anytime during the lifetime of the sensor network.

The present invention (in some preferred embodiments) further improves upon key management in sensor networks by combining the LDK system with a random key system, thereby providing a system that provides the advantages of both systems.

The present invention (in some preferred embodiments) improves upon key management in sensor networks by having anchor nodes transmit beacons at different power levels, and by having each beacon at each power level contain a different set of nonces. Each sensor node receives a set of beacons based on the relative location of the sensor node and the various anchor nodes. The sensor node then decrypts each beacon message and obtains the nonces contained in each of the beacons. The sensor node then obtains updated keys using a combination of the common key and the received set of nonces. The procedure for obtaining updated keys is repeated by every sensor node in the network. As a result of this procedure, the keys on the various sensor nodes are location dependent because sensors that are not in the same location receive a different set of nonces, as a result of which the resulting keys are different.

The present invention (in some preferred embodiments) improves upon key management in sensor networks by having sensor nodes set up secure links amongst themselves using the keys that they received from the initialization phase. A pair of neighboring sensor nodes set up a secure link if the minimum number of common keys that this pair of sensor nodes share after the initialization phase, is not zero.

The present invention (in some preferred embodiments) additionally improves upon key management in sensor networks by necessitating an adversary to have all the common keys that define the link for the adversary to eavesdrop successfully on the secure link formed by these sensor nodes. In this system, the order of the keys can also result in a different derived key.

The present invention (in some preferred embodiments) improves upon key management in sensor networks by achieved key revocation with a separate controller node that shares a different key with each sensor node. Consequently, the controller can use a different key to send a revocation message to each sensor node. The revocation messages for compromised nodes can be restricted to a limited geographical area thereby saving on communication costs.

The above and/or other aspects, features, and/or advantages of various embodiments will be further appreciated in view of the following description in conjunction with the accompanying figures. Various embodiments can include and/or exclude different aspects, features, and/or advantages where applicable. In addition, various embodiments can combine one or more aspect or feature of other embodiments where applicable. The descriptions of aspects, features, and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 12 shows an illustrative computer or control unit that can be used to implement computerized process steps, to be carried out by devices, such as, e.g., an access point and/or a user station, in some embodiments of the invention.

DISCUSSION OF THE PREFERRED EMBODIMENTS

Figure 1:
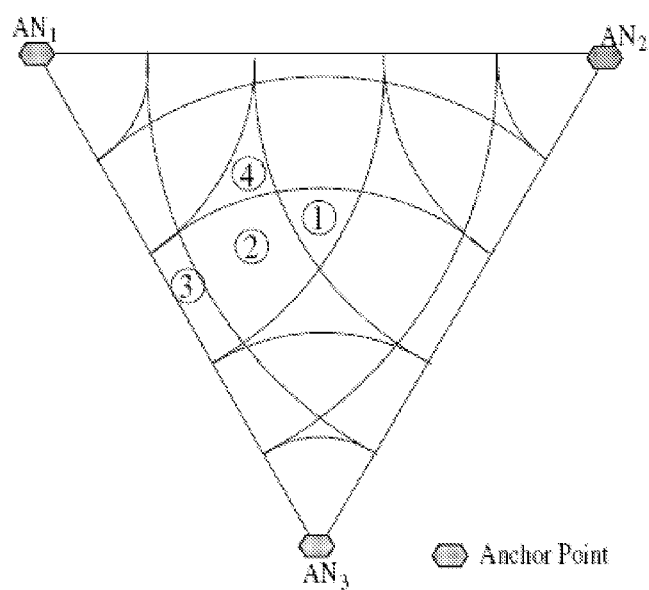
FIG. 1 is an illustrative example of the location based keying system of the present invention.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

A system for key management in sensor networks of the preferred embodiments of the present invention takes the location of sensor nodes into consideration while deciding which keys to be deployed on each node. As a result, this system not only reduces the number of keys that have to be stored on each sensor node but also provides for the containment of node compromise. The present system provides containment of a compromise of a node in a particular location, to the communications around that location. This approach, termed "location dependent key management", does not require any knowledge about the deployment of sensor nodes. The system starts off with loading a single key on each sensor node prior to deployment. The actual keys are then derived from this single key once the sensor nodes are deployed. The present system allows for additional sensor nodes to be added to the network at any point in time.

Sensor nodes are a group of sensor components of a sensor network linked by wireless media to perform distributed sensing tasks. A wireless sensor network consists of spatially distributed autonomous devices using sensors to monitor one or more characteristics of a region. The characteristics may include physical or environmental conditions, such as temperature, sound, vibration, pressure, motion, or pollutants, at different locations, as welt as other types of characteristics.

I . Introduction to Key Management Systems

Sensor networks have increasingly become the subject of intense scientific interest over the past few years. These networks can vary in size and design, depending upon the application. The sensors are primarily characterized by low cost, small size, dense deployment, and low mobility, lifetime constrained by battery power as well as by limited resources in terms of storage, computational, memory, and communication capabilities.

The sensor nodes that constitute these networks would need to communicate with each other in order to attain their objective. Objectives could be of several types such as target tracking, environmental monitoring, exchanging control information, etc. It is vital that this communication be done securely in order to protect against various attacks that can be launched by the adversaries. Therefore, the existence of secure communication channels is crucial for these networks.

To enable secure communication between any two entities, both of the entities should possess a secret value or key. The possible ways in which secure communication can be established are for the entities concerned to share a single key (symmetric-key system) or for the entities concerned to possess different keys (asymmetric-key system). Key management is the process by which those keys are distributed to nodes on the network and how they are further updated if required and erased when the keys are compromised, etc. Key management has lately been a very active area of research in sensor networks.

The importance of key management cannot be overemphasized for both traditional and ad-hoc networks. When employing cryptographic systems a key management service is always required. Key management in sensor networks is more difficult than in traditional networks. This is because of several factors such as vagaries of wireless links, lack of a central authority, vulnerability of nodes to physical capture constraints on resources which implies the impracticality of being able to use public key cryptosystems, lack of a-priori information about the configuration of nodes after deployment, etc. In this paper we focus on key management in sensor networks.

There have been several proposals to address the problem of key management in sensor networks as noted in the references [1], [2], [3], [4], [5], [6], [8], [9], [10], and [12] incorporated by reference herein above All of these proposals are based on the usage of symmetric keys on account of the resource constraints associated with these networks. The proposals vary from deterministic systems such as deploying the same key on all the sensor nodes [1] to probabilistic systems where each sensor node has a set of keys randomly deployed before deployment [6]. The former system is sensitive to compromise since compromise of a single sensor node and the resultant leakage of the single common key makes communication in the entire network vulnerable. In the case of the probabilistic system two neighboring nodes can communicate only if they share common keys. The keys have been loaded on these nodes before deployment. This approach is far more robust from a security point of view as compared to the deterministic system, but this is at the cost of increasing the number of keys stored on each sensor node. An increased number of keys on each sensor node are needed in order to improve the chances for two neighboring nodes to share common keys and thereby form secure links. This translates into an increased demand on the memory capacity of each sensor node.

A problem with many of the prior systems is that they do not take into consideration the location of sensor nodes after deployment. If the set of the neighbors of a node after deployment is known perfectly, then key pre-distribution becomes trivial. In this case, given a node, we need to generate a pair-wise key that this node will share with each of its neighbors and load this set on this node as well as on its neighboring nodes before deployment. This approach also ensures that the impact of compromise of any node is restricted to the region of the compromised node. But a problem is that such an assumption (of perfect knowledge of the neighbors of a node) is unrealistic. This is due to the fact that nodes in networks such as sensor networks are randomly deployed.

II. Related Work in the Area of Key Management in Sensor Networks

A widely used approach for key management is based on the use of symmetric algorithms, as disclosed in references [4], [3], [5], [6], and [9]. These proposals assume that nodes share prior context before the network operation begins. This prior context is generally in the form of an offline secret key pre-distribution before network deployment. Thus, symmetric keys are loaded on the sensors before deployment. These keys are then used by the nodes after the nodes are deployed in order to set up a secure communication infrastructure for use during the operation of the network.

Several solutions based on pre-deployed keying have been proposed, including approaches based on the use of a global key shared by all nodes [1], approaches in which every node shares a unique key with the base station [10], and approaches based on nodes being deployed with a random set of keys as disclosed in references [6], [2], [4], [3], [5], and [9].

In reference [1] the authors consider the approach of using a global key that is shared by all nodes. They consider sensor networks that consist of tamper resistant nodes. All nodes before deployment are initialized with a single symmetric key, which thereby saves on storage and search time. This single key is then used to derive the keys used to protect data traffic. The approach of using a single key in the entire network is problematic from a security standpoint since the compromise of a single sensor will break the security of the entire network. Use of tamper resistant nodes to address this concern adds to the cost of sensor nodes. This will also make key revocation difficult.

Pairwise secret sharing avoids the problem of complete compromise of the network. In fact, such a system has perfect resilience. This is because compromising a node does not impact the security of communication links formed between any non-compromised nodes. Unfortunately the system places great demands on the amount of storage needed on each sensor node, which makes it an impractical solution for large sized networks. For example, with networks of n nodes, each node will contain (n−1) keys for a total of n(n−1)/2 keys in the entire network. It should be note that many of these keys will not be used since direct communication between nodes is possible only if the nodes are neighbors. This solution also makes it difficult to add more nodes to a deployed system than intended initially, since it involves re-keying with all the deployed nodes. The procedure to load keys into the sensor also adds to the costs associated with key management.

In [10] the authors use the second approach given earlier where every sensor node in the network shares a unique key with the basestation. The master secret key is deployed in each node at the time of citation. All other keys needed during the operation of the network are derived from this key. Thus, this approach can be considered a special case of the pairwise key approach, where a node shares a pairwise key with only one other special node (which is the basestation). Compromise of sensors can only break the secure link between the node and the basestation if no other secure links have been set up by the node. Compromise of the basestation can render the entire network insecure. A problem with this approach is the need for every node in the network to be able to communicate with the basestation during the process of key establishment. This can result in an unbalanced load on the nodes closest to the basestation, thereby resulting in decreased network lifetime. This communication pattern also makes it easy for an adversary to perform traffic analysis, while also resulting in the basestation being the single point of failure. Some of these drawbacks can be partially addressed by having multiple basestations in the network.

We next consider approaches based on nodes being loaded before deployment with a random set of keys. Such approaches are typically referred to as probabilistic key sharing approaches. A probabilistic key sharing approach was first proposed in [6]. The authors advocate of this system that each node be loaded with a set of keys before deployment. These keys are randomly chosen from a larger pool of keys. After deployment a secure link can be established between a pair of nodes, provided a key happens to be common to both of these nodes. On account of the random allocation of keys on the various nodes, it is possible that a shared key will not exist between certain pairs of neighboring nodes. The possibility of this happening can be made negligible if the number of keys on each node and in the larger pool of keys is properly chosen.

In [2] the authors propose an enhancement to the basic system. They propose that two nodes must share at least $q>1$ common keys in order to set up a secure link. By requiring a larger number of common keys between any two nodes, the resilience of the network against node capture is increased. Increasing the threshold makes it exponentially harder for an attacker with a given set of keys to break a link between two non-compromised nodes. On the other hand in order to make it possible for two nodes to establish a secure link with some probability, it is necessary to reduce the size of the key pool. This implies that it is possible for the adversary to compromise a larger percentage of keys in the key pool by controlling fewer nodes which implies that the network is more vulnerable when a larger number of nodes have been compromised. Thus, these are two opposing factors which result in better security than the basic system of [6] for a small number of compromised nodes. For a larger number of compromised nodes though, the performance is worse as compared to the basic system.

Several other similar probabilistic systems have also been proposed. For example, probabilistic approaches leveraging polynomial based systems have been proposed independently in [8], [9] and [3], and [5]. It should be noted that the various proposals leveraging the approach of probabilistic key sharing differ in terms of the structure of the key pool, the number of common keys required, the applicability to a dynamic deployment scenario and the method of determining the common keys.

The probabilistic systems require that the average number of neighbors of a node be above a threshold in order to ensure that secure links can be established by each node in the network. Thus such systems will not be suitable for networks where nodes are not densely distributed nor for networks where the node density is non-uniform. This is due to the probabilistic nature of key establishment in such networks, which could result in a disconnected network on account of the fact that certain critical pairs of nodes could not successfully perform key establishment. Additionally, the setting up of a secure channel between neighboring nodes which do not share common keys might require communication over multiple hops. This increases the workload of the sensor nodes and also the latency associated with setting up secure links in the network.

All of the systems that we have considered so far have not exploited information related to the deployment of nodes in the network. If this information is available, then it might help to significantly enhance the performance of the various systems. This is because, in this case, the system can ensure that nodes closer together have a larger number of common keys. Nodes that are far off might have no common keys. This is the approach taken in [4]. The authors assume that information about deployment of sensor nodes is available before the nodes are deployed, which is not the case in many instances.

III. The Locationd Dependent Key Management System (LDK) of the Preferred Embodiments The network scenario that we consider consists of resource constrained sensor nodes. Nodes can be added to this network at any point in time. The threat model that we consider assumes that the adversaries have very strong capabilities. The only constraint on their capability is that the adversaries will not be able to compromise a node for a small interval initially after the node is deployed. This interval can be of the order of milliseconds and definitely not more than a couple of seconds. After this initial interval an adversary might be able to compromise any node. Once a node is compromised, the adversary has access to all the keying material on the node. Following such a node compromise, the adversary is able to eavesdrop on all the links that have been secured using the compromised keying material.

Given this scenario as well as the goal of minimizing the costs of key management, a simple approach is to load a single common key on all the sensor nodes before deploying them. After deployment, each sensor node can use this common key to derive a different key with each of its neighbors. Following this, each sensor node is expected to delete the common key. Deletion of this common key is to prevent the adversary from being able to access it by compromising any sensor node after the initial secure time interval. Thus, each link is secured by a different key. Hence, compromise of a node will only affect the links that the compromised node in which the node is involved. This is a viable system given the assumption that the adversary will not be able to break into any sensor node for a small time interval after deployment. A problem with this approach is that it requires all of the nodes in the network to be deployed at the same time. This approach cannot be used in scenarios where the sensor nodes are deployed at different points in time since the nodes that have been deployed earlier have destroyed the common key and hence will not be able to communicate with the nodes that were deployed later.

The location dependent key management system (LDK) of the present invention addresses the shortcomings of the above system. We assume two types of nodes namely the regular sensor nodes as well as anchor nodes (AN). The only extra capability that an anchor node needs to have is the ability to transmit at different power levels. This is a capability that is already present in current sensor nodes. For example, the output power range of mica2 sensor nodes varies from −20 to 10 dBm and can be controlled via software. Similarly the WINS sensor nodes can transmit at 15 distinct power levels ranging from −9.3 to 15.6 dBm (0.12 to 36.31 mW). Use of a different power level will result in a different transmission range.

It should be noted that the presence of such anchor nodes is also assumed in other areas. One such area is to enable sensor nodes to determine their locations securely [11] and [7]. Note that the anchor nodes do not need to be physically deployed for our system. In fact, the mechanism used to deploy the sensor nodes can provide the functionality required by the anchor nodes. For example, consider an automated vehicle used to deploy the sensor nodes. The same automated vehicle can contain one or more antennae capable of transmitting at different power levels. Every time that the sensor nodes are scattered, one or more multiple antennae present in the vehicle can transmit messages needed by LDK to function. In fact, this can be a cost effective way of implementing LDK. In the sequel though, we assume the anchor nodes as separate physical entities for ease of explanation.

Consider a network with $N_s$ sensor nodes and $N_a$ anchor nodes. We consider three phases in the lifetime of these sensor nodes. These are:

1) Pre-deployment phase;
2) Initialization phase; and
3) Communication phase.

During the pre-deployment phase, every sensor node as well as every anchor node (AN) is loaded with a single common key K. We start with a single common key on all nodes in order to minimize the costs associated with key management. Following this the sensor and anchor nodes are deployed. The other two phases namely the initialization phase and the communication phase occur after deployment.

During the initialization phase an AN transmits a beacon at each different power level. Each beacon contains a nonce (random number) encrypted using the common key K shared between all the nodes. The term "nonce" refers to a one-time random bit-string. A nonce may be generated by a node. The beacons transmitted at different power levels contain a different set of nonces. Each sensor node receives a set of beacons based on the relative location of the sensor node and the various anchor nodes. The sensor node then decrypts each beacon message and obtains the nonces contained in each of the beacons. The sensor node then obtains the updated keys using a combination of the common key K and the received set of nonces.

In order to clarify this further, consider a sensor node S. Let S receive $R_i$ beacons from one or more ANs. We denote the nonces present in each of these beacons as $n^i_1, n^i_2, \ldots, n^i_{R4}$. The node S then obtains $R_i$ updated keys from the single key K. These updated keys denoted as $k^i_1, k^i_2, \ldots, k^i_{R4}$ are obtained as follows: $k^i_j = H_K(n^i_j)$ where H( ) denotes a one way function that is also common to all the sensor nodes. Following this the common key K is deleted by the sensor node marking the end of the initialization phase.

The procedure for obtaining updated keys is repeated by every sensor node in the network. As a result of this procedure, the keys on the various sensor nodes are location dependent. This is because sensors that are not in the same location receive a different set of nonces due to which the resulting keys are different. The proposed system assumes that each sensor node is within the maximum transmission range of one or more anchor nodes. If a sensor node does not receive any beacons (and hence does not receive any nonces) then it will not have the updated keys, and thus it will not be able to participate in the network activities later. The density of anchor nodes should be such that this does not happen.

Following the initialization phase, we have the communication phase. In this phase the sensor nodes set up secure links amongst themselves using the keys that they received from the initialization phase. A pair of neighboring sensor nodes set up a secure link if the minimum number of common keys $N_c$ that this pair of sensor nodes share after the initialization phase, is non-zero. Note that the actual number of common keys $N_c$ between a pair of sensor nodes must be greater than or equal to $N_c$ for these two nodes to be able to set up a secure link between themselves. If $N_c$ is greater than $N_c$ then the two nodes are assumed to form a single derived key from all these common keys as $H(k_1, k_2, \ldots, k_{Kc})$ where $H( )$ denotes a one way function. Thus, to eavesdrop successfully on the secure link formed by these sensor nodes, an adversary needs to have all the $N_c$ (and not just $N_c$) common keys that define the link key. In fact, the order of the keys can also result in a different derived key. In the sequel we assume that the adversary knows of this order. This assumes more powerful capabilities for the adversary and is hence justified.

We next explain this system using an example. We assume an ideal environment where the transmission ranges are circles, though our system works similarly in realistic conditions also. Consider the area as shown in FIG. 1. In this example there are three ANs, with each AN having five power transmission levels. Each power level is assumed to correspond to a different transmission range characterized as a circle of radius $R_i$, i=1, ..., 5. Thus R is different for the different power levels. In FIG. 1 the ranges corresponding to the first four power levels are represented as circles. The circle corresponding to the highest power level is not shown. We assume that the three ANs have identical capabilities in terms of the number and value of each of the available power levels.

Let Nij represent the beacon corresponding to the $j^{th}$ power level from the $i^{th}$ AN. For example, N12 represents the beacon corresponding to the second power level of the first AN (AN 1). A sensor at a distance d from an AN would receive all the beacons transmitted using power levels corresponding to transmission range greater than d from the AN.

Consider the four sub-regions denoted as 1, 2, 3, and 4 in FIG. 1. A sensor node present in sub-region 1 receives the set of beacons {N13, N14, N15, N23, N24, N25, N33, N34, and N35}. Any sensor node present in sub-region 1 can set up a secure link with any other sensor node in the same region as long as $N_c$ is less than 10. Note that $N_c$ for any two sensor nodes in sub-region 1 equals 9. $N_c$ on the other hand is a predetermined parameter that is set by the designers of the system. Similarly, a sensor node present in sub-region 2 receives the set of beacons {N13, N14, N15, N24, N25, N33, N34, and N35}. Thus, sensor nodes in this region can also set up a secure link provided $N_c$<9. A sensor node in sub-region 1 and a sensor node in sub-region 2 will have 8 common keys and hence can also set up secure links between themselves provided $N_c$<9. Similarly, nodes in sub-region 3 receive the beacons {N13, N14, N15, N25, N33, N34, N35}, while those in sub-region 4 will receive the beacons {N13, N14, N15, N24, N25, N34, N35}.

It should be noted that all nodes located in the same sub-region would be using the same key to protect the communication between them. As a result, compromise of any node in the sub-region will also expose to the adversary, the communications between any other non-compromised nodes present in the same region. For example, a compromised node in sub-region 2 will cause the breakage of secure links formed by other nodes that use the keys heard in sub-region 2. In addition, there are some regions that are more sensitive in the sense that compromising a node in such a region will lead to a better payoff for the adversary. For example, a compromised node present in sub-region 2 can also lead to compromise of all secure links formed by nodes in sub-regions 3 and 4. Thus, sub-region 2 is more sensitive. Compromise of a single node in sub-region 3 will not impact communication between nodes in other subregions. Thus, sub-region 3 is less sensitive. The density of ANs as well as the number of power levels of the ANs has to be chosen such that such sensitive areas are minimal while also reducing the size of each sub-region. This choice impacts positively on the impact of node compromise. Typically, increasing the density as well as the number of power levels of each AN will achieve both these goals.

Further note that with these set of keys, an adversary cannot eavesdrop at all on links formed by sensor nodes that act outside the maximum transmission range of these three ANs. Thus, the effect of node compromise is completely localized. Thus, nodes that are outside the transmission range of any of these three ANs shown in FIG. 1 are not affected by the compromise of a node in sub-region 2. This is unlike the case for current deterministic or probabilistic systems where the effects of node compromise are not restricted to the area around the compromised node. Note also that the number of keys that are stored on each node will depend on the number of beacons that the node receives. The number of beacons received is a function of the density of the ANs as well as the number of power levels on each AN.

Variation 1: Threshold Based LDK

In the case of a simple variation of the above strategy, the pre-deployment as well as the initialization phases is unchanged. But during the communication phase, we assume that a pair of neighboring sensor nodes set up a secure link if the actual number of common keys $N_c$ that this pair of sensor nodes shares after the initialization phase is greater than 1. Thus, in this i we have $N_c$>1.

This variation is motivated by a similar approach proposed for probabilistic systems in [2] where this variation has been proposed for the random key deployment strategy. The main idea there is that if $N_c$>1, then the number of links that an adversary can successfully eavesdrop on keeps on reducing. Of course, increasing value of $N_c$ also makes it more difficult for honest nodes also to communicate. From our earlier example, we see that nodes in sub-region 1 of FIG. 1, can still form secure links between themselves provided 1<$N_c$<10. Similarly, nodes in sub-region 2 can also form secure links between themselves if 1<$N_c$<9.

We next describe how nodes can be incrementally added to the system above. Sensor nodes that have to be added to an already deployed network are loaded with the same key K that was installed on the deployed sensor nodes in the pre-deployment phase. Following this the sensor nodes are deployed. The ANs are then expected to transmit the same set of beacons with the same nonces at the various power levels as used earlier. The newly deployed sensor nodes then repeat the same process as done by the other sensor nodes earlier. As a result, it is easy to see that the newly deployed sensor nodes will have the same set of keys as present on other nodes in its neighborhood.

Note that if the ANs are deployed as separate sensor nodes, then the common key K present on the ANs will have to be protected using tamper proof hardware. This will add to the costs associated with key management. Equipping the automated vehicle used to deploy sensor nodes with extra antennae, as explained earlier, can solve this problem. Of course, the vehicle will have to be present at the same location as it was at when it deployed the first batch of sensors. This can be ensured by making use of GPS capabilities in the vehicle. This ensures that the beacons are transmitted from the same location when adding the new batch of sensors to the network. Further, these transmissions will also have to use the same number of power levels and nonces.

If revocation is needed then a separate controller node would have to be used for this. The controller needs to share a different key with each sensor node. The controller uses this key to send a revocation message to the sensor nodes. An advantage of LDK is that for few compromised nodes the revocation messages could be restricted to a limited geographical area thereby saving on the communication costs.

We would like to remark again that in the above description we assumed that transmission ranges correspond to circles. In reality they will not, but this should not impact the way the system works. Such realistic cases will only result in changing the shape and size of the sub-region as welt as the beacons received by the sensor nodes. The beacons missed by sensor nodes can be reduced by repeated transmission.

IV. Performance Analysis

Discussion of the Performance of Both Systems Namely Basic LDK and Threshold Based LDK.

The following discussion relates to the impact of the different parameters on the performance of these systems and includes a comparison of the performance of LDK with the basic random key distribution system given in [6].

Three metrics are used, as follows:
1. Connectivity ratio: For a given node this is defined as the ratio of the number of neighbors of the node with which it can form secure links to the total number of neighbors of the node. The connectivity ratio for the network is then the average of the connectivity values for each of the nodes in the network. Note that this is a value between 0 and 1, with 1 being the most desirable value since it indicates complete connectivity amongst every node and its neighbors.
2. Compromise ratio: The compromise ratio is defined as the ratio of the number of secure links formed by the non-compromised nodes that have become vulnerable, to the total number of secure links formed by non-compromised nodes in the network. The secure links become vulnerable on account of the leakage of keying material on the compromised nodes. Note that we do not consider the links formed by the compromised nodes. The compromise ratio is zero when no node in the network is compromised. A good key management system should have a value of zero for the compromise ratio even when the network has compromised nodes. For example, the pairwise key system will have a compromise ratio value of zero since compromise of any node does not impact the links formed by any of the non-compromised nodes. A value of 1 indicates that none of the links formed by the non-compromised nodes are secure after the compromise. For example, the single network wide key system will have a compromise ratio value of 1 as soon as at least one node is compromised.
3. Memory usage: This is measured by the avenge number of sub-keys that every node needs to store in order to set up secure links.

We start off by investigating the expected number of keys stored on each sensor node when using LDK. This gives a measure of the memory capacity of every sensor that needs to be devoted for key management. It will be seen that the LDK system provides a big advantage of over the probabilistic key deployment systems, due to the reduced number of keys that need to be stored on each sensor node. This advantage is attended while achieving the same connectivity and lower compromise ratio (for large number of compromised nodes).

A. Expected Number of Keys on Each Node

The number of keys stored on a sensor node depends on the number of messages that the node receives from the various ANs. It should be noted that each message contains a nonce that is then used to derive one sub-key. Hence we need to determine the expected number of messages $E_N$ received by a sensor node. In order to do this, we divide the messages transmitted by each AN into $N_p$ different categories, where $N_p$ is the number of power levels on each AN. The messages transmitted at the $i^{th}$ power level are called type i messages. Type 1 messages correspond to the lowest power level while type $N_p$ messages correspond to the highest power level. Therefore if a sensor node receives type i messages then it also receives messages of type j where $j \geq i$. It should be noted that it is assumed that there is a reliable communication of messages. As employed herein, the term "$R_i$" denotes the transmission range corresponding to the $i^{th}$ power level at the AN with $R_0=0$. Thus messages of type i are received by all sensor nodes located at a distance less than $R_i$ from the AN.

Consider a sensor node S. We seek to determine the expected number of ANs from which the smallest type messages received by S are type i messages. We denote this as "$E^i_A$". $E_N$ can then easily be determined from $E^i_A$ as:

$$E_N = \sum_{j=1}^{N_P} (N_P - j + 1) E^i_A \quad (1)$$

Note that the above expression corresponds to the expected number of keys on each sensor node. This expression will be studied in comparison with the expected number of keys as obtained via simulation for some representative scenarios.

$E^i_A$ corresponds to the expected number of ANs that are in the annulus with a outer radius $R_i$ and an inner radius $R_{i-1}$ from S and centered on S. In order to determine $E^i_A$ we need to calculate the probability of k ANs being in the annulus with an outer radius $R_i$ and an inner radius $R_{i-1}$ from S and centered on the S.

Since ANs are deployed uniformly in the network, the probability for an AN to be in an area of size $A_a$ is given by $p_g = A_a/A$ where A is the area of the network. Furthers the probability of k, k>1 ANs being deployed in the same network area is statistically independent and is given by the binomial distribution as $$P(k \in A_a) = \binom{N_a}{k} p_g^k (1 - p_g)^{(N_a - k)} \quad (2)$$

We can approximate the binomial distribution with a Poisson distribution for $A \gg A_a$ and $N_a \gg 1$. Hence we have $$P(k \in A_a) = \frac{\frac{A_a}{A}N_a}{k!}e^{-\frac{A_a}{A}N_a} = \frac{\rho_L A_a}{k!}e^{-\rho_L A_a} \quad (3)$$

where $\rho_L$ indicates the density of AN deployment. In our case $A_a$ corresponds to the area of the annulus and hence $A_a = \pi(R_i^2 - R_{i-1}^2)$ Thus the probability of k ANs being in the annulus with an outer radius $R_i$ and an inner radius $R_{i-1}$ from S and centered on the S denoted as is given by $$P_k^i = \frac{\rho_L \pi (R_i^2 - R_{i-1}^2)}{k!} e^{-\rho_L \pi (R_i^2 - R_{i-1}^2)} \quad (4)$$

Hence, the expected number of ANs from which $S_i$ receives type i messages and not type j, j<i messages is given by $$E_A^i = \sum_{j=1}^{N_a} j P_j^i \quad (5)$$

Thus, $$E_N = \sum_{j=1}^{N_P} \sum_{i=1}^{N_a} i(N_P - j + 1) \left( \frac{\rho_L \pi (R_j^2 - R_{j-1}^2)}{i!} e^{-\rho_L \pi (R_j^2 - R_{j-1}^2)} \right) \quad (6)$$

Next, the above expression is verified using simulations. The scenario that is considered for this verification has the sensor network deployed over a 3×3 unit² area. For simplicity this unit is referred to as "m" in the sequel. Each sensor node has a transmission radius of 0.2 m while the maximum transmission radius of ANs, $R_{Np}$, is variable. We consider an AN density of 11 nodes per unit area. The network is assumed to have 500 sensor nodes. The simulation results have been averaged over 10 trials.

Figure 2:
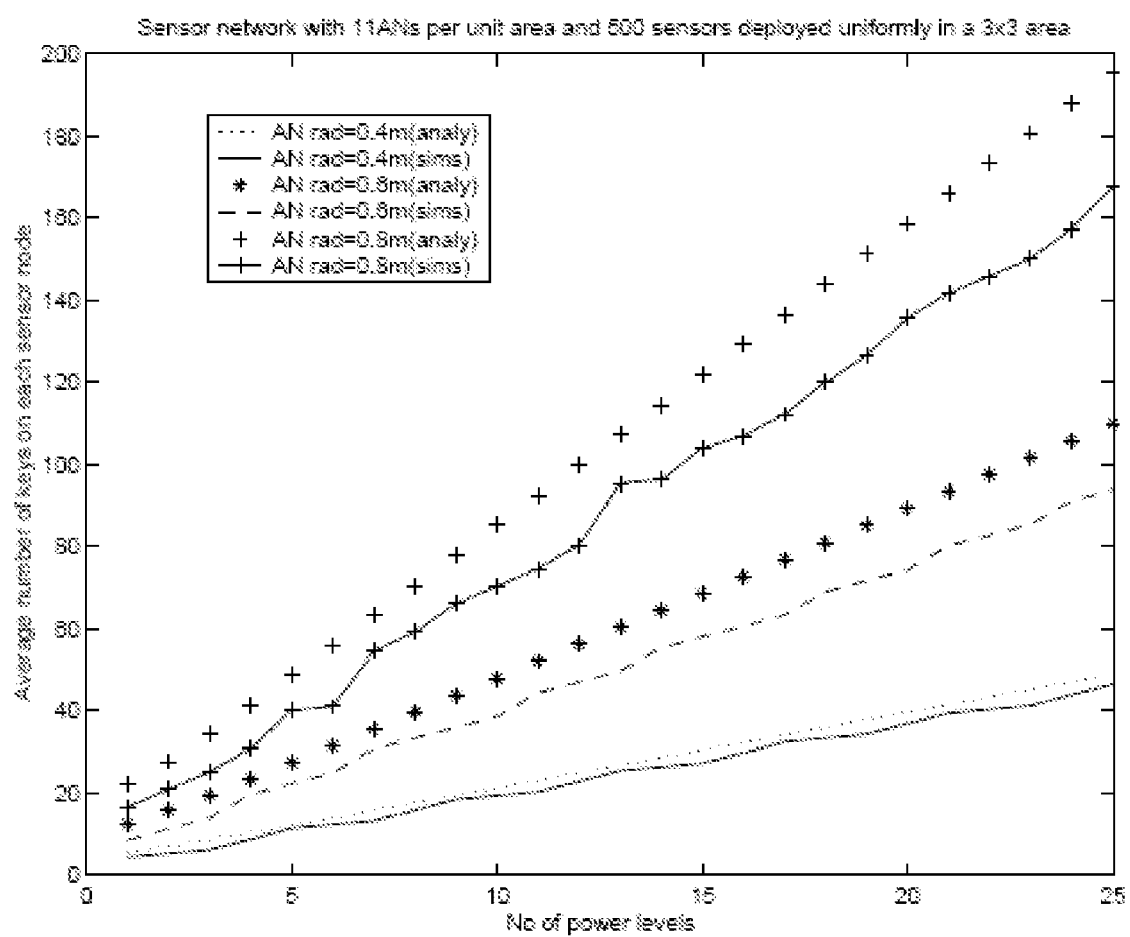
FIG. 2 is a graph of the average number of keys for a sensor network with 11 NAs per unit area and 500 sensors deployed uniformly in a 3×3 area.

Given this scenario we illustrate the average number of keys on each sensor node in FIG. 2. The number of power levels on each AN is shown on the x-axis. The average number of keys on each sensor node is plotted on the y-axis. We consider four different values for the maximum transmission range $R_{Np}$ of an AN. These are 0.4 m, 0.6 m, 0.8 m, and 1.0 m. We show the results of both simulations and analysis in this figure. First, we observe the close match between simulations and analysis especially for lower values of $R_{Np}$. Higher values of $R_{Np}$ exacerbate the boundary conditions that we have neglected in our analysis. Specifically, sensor nodes near the boundary receive lesser number of messages from ANs than is assumed in the derivation of equation 5. As a result the expected number obtained from equation 6 should be higher than obtained through simulations We see that this is indeed the case. We also see from FIG. 2 that average number of keys on a sensor nodes depends not only on the AN transmission radius but also on the number of power levels used. And this number varies between 10 and 275 as seen from the figure for the given set of parameters. Note that this number does not depend on the value of $N_c$.

Figure 3:
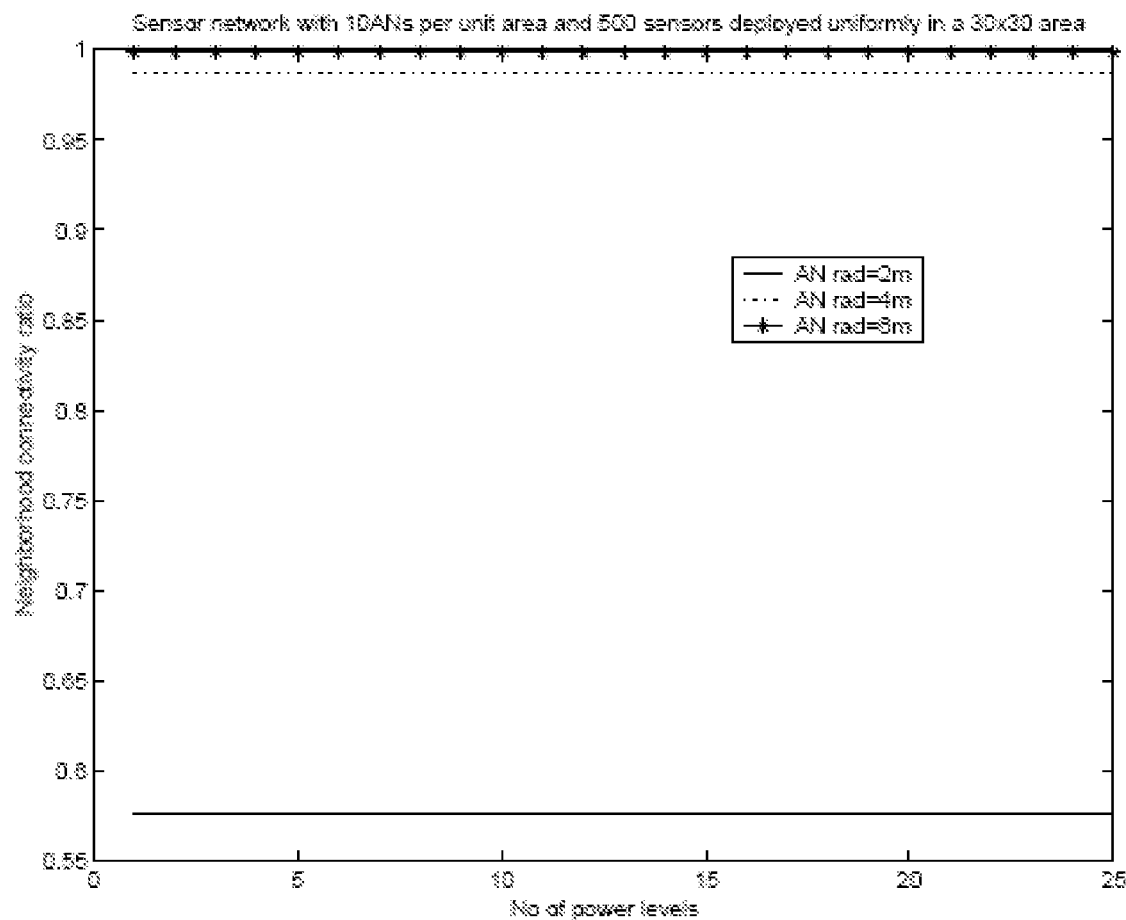
FIG. 3 is a graph of the effects on connectivity in a sensor network with 10 NAs per unit area and 500 sensors deployed uniformly in a 30×30 area.

An important question though is whether the sensor network will be connected in this configuration and if so what number of sub-keys would be needed to ensure a high degree of connectivity. We investigate this for the same scenario via simulations and show the result in FIG. 3. In this figure we consider the basic LDK where $N_c=1$. As for the earlier figure, we plot the number of power levels on the x-axis while we plot the connectivity ratio on the y-axis. We plot only three values of $R_{Np}$ since for $R_{Np}$, values of 0.8 m and 1.0 m, the connectivity ratio is 1.0 for all values of the power levels. More precisely, the connectivity ratio for values of 0.4 m and 0.6 m is also very close to 1. Only for value of 0.2 m is the connectivity ratio quite low. Thus, we see that we can achieve a connectivity ratio of one even with approximately 20 sub-keys on every node.

It is also seen from this figure that the connectivity ratio is independent of the power level when $N_c=1$. This is true for the basic system when $N_c=1$ due to the fact that if a sensor node is within the coverage of an AN, then it will receive at least one beacon message which will allow it to connect to its neighbors provided they also have at least one sub-key from the same AN This is not true for the threshold based LDK as we will see later.

Another important property that we see from this is that as the value of $R_{Np}$ of an AN increases, so does the connectivity ratio. This is because with a larger $R_{Np}$, a greater number of sensor nodes are able to receive messages from the same AN. This increases connectivity amongst the neighbors of a sensor node since now the probability of two neighboring nodes sharing a common key is higher.

Figure 4:
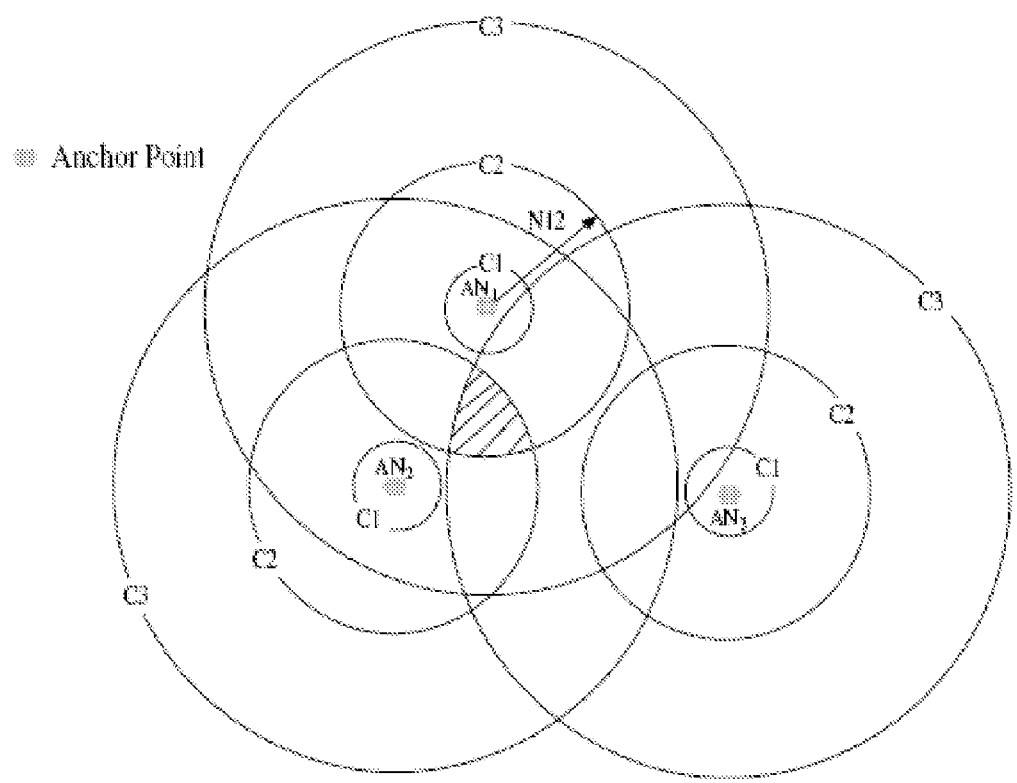
FIG. 4 is a schematic illustration of the behavior of location dependant key management.

In order to explain these observations, reference is made to FIG. 4, which shows a sensor network deployment with three ANs explicitly shown. Each AN has three different power levels as shown. Given this deployment (with Nij as earlier representing the message corresponding to the $j^{th}$ power level from the $i^{th}$ AN) consider a sensor node $S_1$ that receives only N13. Also consider another sensor node $S_2$ that is located just beyond the range denoted by C3 from AN1 and is a neighbor of $S_1$. $S_2$ does not receive any beacon messages initially but will do so when the range corresponding to C3 for AN1 is increased. This will enable $S_1$ and $S_2$ to set up secure links between themselves and increases the connectivity ratio.

The other observation was that the connectivity ratio is insensitive to the number of power levels with $N_c=1$. To see this, consider a sensor node $S_3$ in the shaded region of FIG. 4. With three power levels on each AP, $S_3$ will receive 2 messages from both AN1 and AN2 and 1 message from AN3. As a result it can set up a secure link with any of its neighbors that are also within the coverage area of any of the three ANs. Now when the number of power levels is decreased to 1, then $S_3$ will receive one message (and hence one secret) from each of the three ANs. Even in this case, $S_3$ can set up secure links with any of its neighbor that is also within the coverage area of any of the three ANs. Thus, the connectivity is not impacted by changing the number of power levels on the AN when $N_c=1$. Note here though that when $N_c$ increases, connectivity ratio is impacted. In the same example, if $N_c=5$ then $S_3$ can form secure links with its neighbors that are also located in the shaded region when three power levels are used on each AN. $S_3$ will also be able to set up secure links with any of its neighbors that are outside the shaded region. Thus, the connectivity ratio is less than what it was when $N_c=1$. Further, with a single power level on each AN and $N_c=5$, $S_3$ cannot set up secure links with any of its neighbors. We will look at the simulations that verify this conclusion for the case of $N_c>1$ later. This example also illustrates what we have seen in FIG. 2 namely the average number of keys on a sensor node keeps on increasing with the power levels of the AN.

Figure 5:
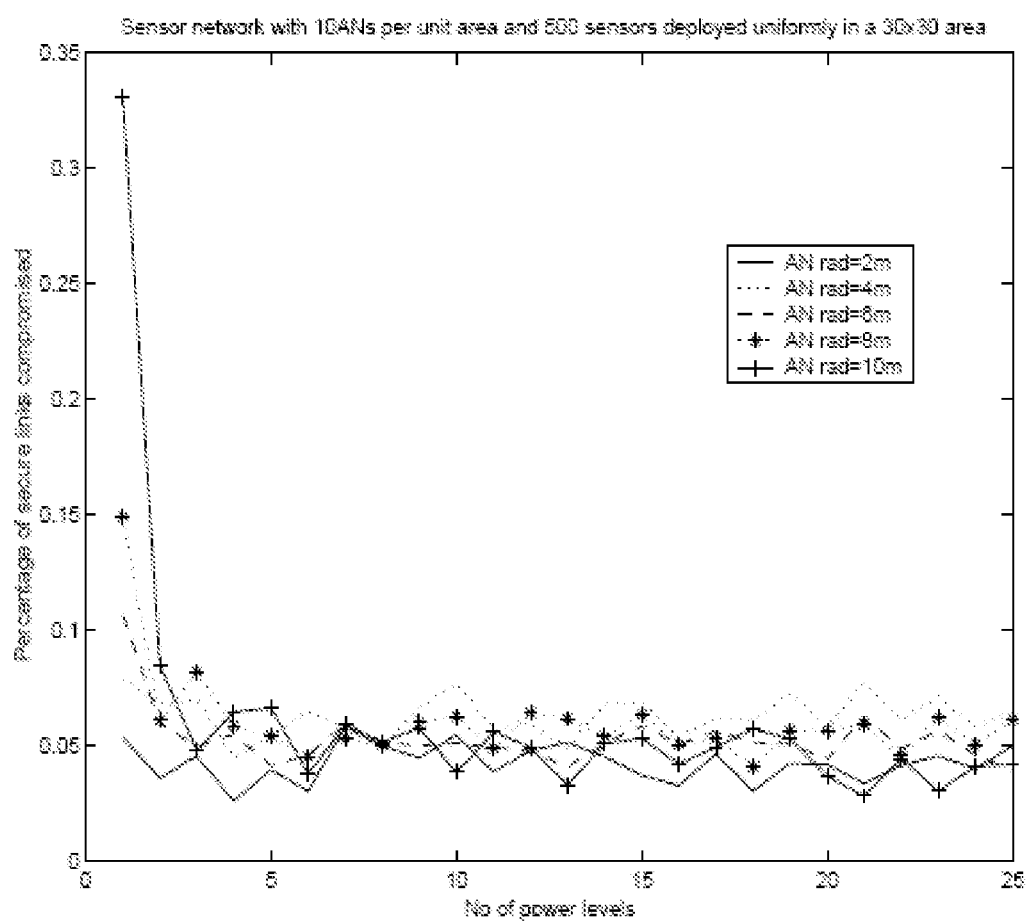
FIG. 5 is a graph of the effects of security of non-compromised nodes in a sensor network with 10 NAs per unit area and 500 sensors deployed uniformly in a 30×30 area.

We next investigate the effects of compromise for this scenario and show the results in FIG. 5. We assume that S of the 500 sensor nodes are compromised and hence the keys on these nodes are known to the adversary. We see that when only one power level is used the impact of compromised nodes is quite severe. For example, with an $R_{Nc}$ of 1.0 m compromise of five nodes (1 percent of all nodes in the system) leads to approximately 33 percent of all secure links to be broken. This is because when using a single power level, ally nodes in the transmission range of an AN know of all the secrets transmitted by the AN. When the number of power levels increases for the same value of $R_{Nc}$, the number of secrets of the AN known by a sensor node depends on the distance of the sensor node from the AN of interest.

We also see this from FIG. 4. Consider the case where all intermediate power levels are eliminated Then the sensor nodes located in the shaded region would know of all the secrets transmitted by the three ANs (there would be one secret transmitted by each AN). Thus, compromise of any node in the shaded region would jeopardize the communication of any other sensor node in the entire system. On the other hand, by having three power levels for each AN as shown in the figure, the nodes in the shaded region do not receive all the secrets from each AN. In such a case, a compromise of a node in the shaded region leads to a lesser number of secure links between non-compromised nodes being jeopardized. Of course, once the number of power levels is beyond a threshold, then this factor (number of power levels) will not have an impact on the compromise ratio. It will also be seen from this Figure that with more than five power levels, the performance is similar for the different values of $R_{Nc}$. Thus, the compromise ratio is sensitive only to very low values of $N_p$.

We look at the compromise ratio in more detail next and explain the influence of various factors on the compromise ratio. Specifically we focus on three parameters for an AN namely the density, the number of power levels as well as the maximum transmission range. We also look at two parameters for the sensor node namely the density and maximum transmission radius.

Both connectivity ration and compromise ratio increase as the density of sensors is increased. This is because with an increase in sensor density there are more nodes that share the same set of keys with a node. As a result, a node is able to set up secure links with more of its neighbors. In addition, compromise of a node also results in impacting more non-compromised nodes and thereby the secure links formed by them. We have indeed verified this behavior in several simulations.

Next, consideration is given to the maximum transmission radius of a sensor. As the maximum transmission radius of sensor nodes increases, it should have a minimal impact on the compromise ratio. The connectivity ratio on the other hand can be reduced. It will also have no impact on the avenge number of keys on every node. This is because increasing the radius of the sensor node results in increasing the number of neighbors of a node. It might be possible that some of the new neighbors of the node do not share any keys with the node since the new neighbors (neighbors obtained with an expanded transmission radius) are not covered by any of the ANs that cover the node. Hence the connectivity ratio could decrease.

The compromise ratio on the other hand should not be affected. More precisely, changing the transmission range of a sensor node will not affect the number of non-compromised nodes impacted due to compromise of any node. This is because a non-compromised node is impacted only when it shares keys with the compromised node. The sharing of keys between nodes is not governed by the transmission range of a sensor. Increasing the transmission range of a sensor can allow a larger number of non-compromised nodes to set up secure links and the fraction of these now secure links that are impacted cannot be predicted. But this number will not be significant and hence can be ignored.

Increasing the number of power levels $N_p$ on an AN while keeping the density of ANs as well as the maximum transmission range $R_{Np}$, the same also does not impact either the connectivity ratio or the compromise ratio. This is because with $N_c=1$, increasing only the number of power levels does not change the number of sensor nodes under the coverage region of an AN. Increasing the density of ANs without changing either $N_p$ or $R_{Np}$, has a positive impact on both the connectivity ratio as well as the compromise ratio. This is due to the fact that by increasing the number of ANs a greater number of sensor nodes can receive beacons, which allows them to derive their own sub-keys. This also has a positive impact on the compromise ratio by reducing the value of compromise ratio since $N_c$ increases with an increase in the density of ANs. Note that $N_c$ is used to derive the key securing a link.

Increasing the maximum transmission radius of an AN has a positive impact on connectivity. This is because by increasing $R_{Np}$ a greater number of sensor nodes will receive beacons from the same AN. This makes it easier for neighboring nodes to share common keys. This will also result in increasing the compromise ratio.

Next, some of the above conclusions are illustrated using illustrative examples. In a first illustrative example, 200 sensor nodes are deployed over a 9×9 unit$^2$ area and $N_c=1$. We consider five different configurations under this scenario. The first configuration that we call config1 consists of 100 ANs. Here the transmission range of a sensor node is assumed to be 0.2 m. The second configuration denoted as config2 is identical to the first except for the transmission range of the sensors, which is increased to 0.8 m. In both of these cases we assume that each AN has five power levels. The effects of varying the range of the sensor nodes on the compromise ratio will be illustrated by these two scenarios.

In the third configuration denoted as config3, we consider that each AN has 25 power levels while the rest of the parameters are the same as config2. The intention behind creating this configuration is to study the effects of large $N_p$. The fourth configuration denoted as config4 is identical to config2 except for the fact that we have 800 ANs in this configuration. This serves to indicate the affects of increasing the density of ANs in the network. In all four configurations the maximum transmission range of the ANs is assumed to be 2 m.

Finally, in config5 we consider a very low density of ANs, specifically, 50 ANs each with 50 power levels and a maximum AN transmission range of 5.0 m. The transmission range of the sensor nodes is 0.8 m. This configuration will illustrate the affects from using very few ANs with very large transmission ranges and high number of power levels. Such a system might be used when the ANs are not deployed separately but are part of the sensor node deployment strategy, as explained earlier.

Figure 6:
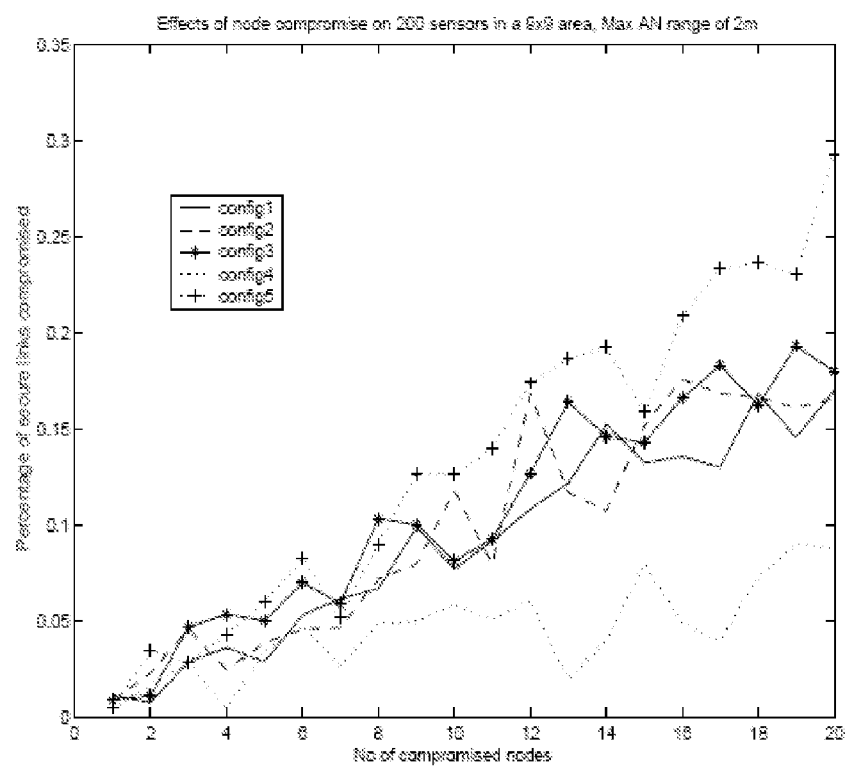
FIG. 6 is a graph showing the performance of the system as a function of compromised nodes.

The impact of node compromise on these five configurations is shown in FIG. 6. It is seen from this figure that the impact of a few compromised nodes (about 1 percent of the nodes in the system) is the same on all five configurations. Further, the impact of increasing the number of compromised nodes is similar on the first three configurations. Thus, a compromise of about 10 percent of the nodes in the network leads to compromise of about 15 to 20 percent of the links formed by the non-compromised nodes for these three configurations. Config4 is the most robust to node compromise while config5 is the least robust. In the configuration of config4, a compromise of 10 percent of the nodes in the network impacts approximately 9 percent of the links formed by the non-compromised nodes. By way of contrast, in config5 a compromise of 10 percent of the nodes in the network impacts about 30 percent of the links formed by the non-compromised nodes.

When the density of the ANs is quite high (config4), then the impact of increasing number of compromised nodes is the least. Note that a sensor node whose location is very close to the AN receives all the messages from the AN. Such a sensor node thereby knows of all the secrets of the AN. The compromising of such a sensor node leaks all the secrets of the corresponding AN. In such a case, the situation is exacerbated when both $N_p$ and $R_{Np}$ are very large. This is the case with config5 where the goal is to ensure connectivity by having fewer ANs with large values of $N_p$ and $R_{Np}$. Here the compromising of some sensor nodes could result in the adversary getting knowledge of 50 keys from the same AN. The compromising of a few sensor nodes in the proper locations has a large impact on the compromise ratio. This is indeed what we see from FIG. 6. With config4 there are many ANs each of which has few number of power levels. Hence, impact of the compromised sensor node does not result in leakage of many keys. In case of config4, for the worst case, compromise of a node will lead to the adversary getting access to five new keys from an AN only, since each AN has five power levels.

In all of these configurations the connectivity ratio is nearly one. It should also be noted that the memory capacity is the highest in case of config5 on account of the large number of power levels on each AN as well as the large value of $R_{Np}$. The average number of keys on each node in this case is about 550. The average number of keys on each sensor node is 194 in case of config4. The memory requirements for config1 and config2 are quite minimal (approximately 24 keys on every sensor node) while every sensor node has 113 keys on the average in case of config3.

Thus, from the above we can conclude that the AN density has to be increased while ensuring that both $N_p$ as well as $R_{Np}$ are not large in order to reduce the impact of compromised nodes. However, this could increase the costs associated with the deployment. If compromise of nodes can be tolerated then the system can deploy a low density of ANs with a large transmission range and fewer power levels.

B. Effects Of a Higher Threshold $N_c$

As before, the effects on connectivity and compromise are considered. As is clear from previous descriptions increasing $N_c$ does not have any effect on the average number of keys on every node and accordingly, there is no need to look at this factor.

Figure 7:
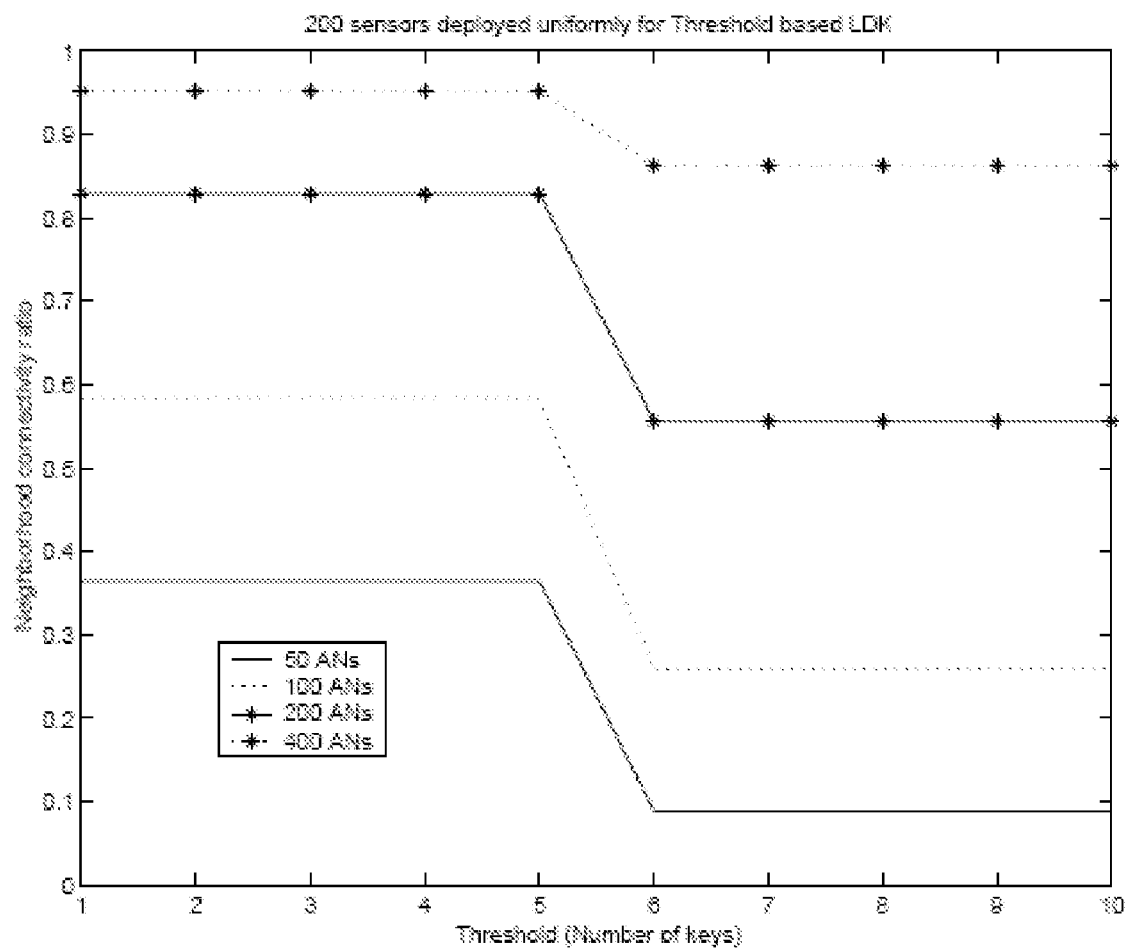
FIG. 7 is a graph of the impact of key threshold on connectivity of 200 sensors deployed uniformly.

This example relates to a 200 node sensor network, each with a transmission range of 0.2 m, the effects of varying $N_c$ on the connectivity ratio and on the compromise ratio are considered. In this example, a variable number of ANs each with five power levels and a maximum transmission radius of 0.8 m are considered. The connectivity ratio is plotted in FIG. 7. From FIG. 7, it is seen that the connectivity ratio decreases as the threshold increases. This is according to what was explained above. An important fact that is seen from FIG. 7 is that the connectivity ratio is like a step function taking two values with values being the same for threshold below 5 and for threshold greater than 5. This is due to the number of power levels used by each AN. A similar performance has been seen with the use of different number of power levels. It is also seen from FIG. 7 that increasing the density of ANs improves the connectivity ratio. This happens since, by increasing the density of ANs, the number of keys on every sensor node increases. This improves the chances for a node to be able to connect to its neighbors.

It has also seen above that varying the threshold does not impact the compromise ratio. This is due to the fact that the number of sub-keys at each sensor node does not change with the threshold. The number of sub-keys at each sensor node, does however, vary with the AN parameters such as the AN density, the number of power levels, and the maximum AN transmission radius. What changes as $N_c$ increases, is the ability of two neighboring nodes to set up a secure link. It should be noted that the way a secure link is set up between these nodes, is by using up all the common keys between them ($N_c$) and not just the minimum number of common keys needed as explained earlier.

Thus, it is seen that threshold based LDK is not very beneficial as it only makes connectivity harder and does not decrease the compromise ratio. This is because the nodes need a greater number of common sub-keys to set up secure links. Hence if nodes have a lesser number of sub-keys, then secure links cannot be set up. This makes connectivity more difficult. At the same time when a node is compromised, then all of the sub-keys on that node are available to the attacker. Other secure links that use a subset of the compromised keys are also vulnerable. The threshold does not affect the compromise probability since we are looking at the percentage of secure links compromised. This is as opposed to what is seen in case of threshold based probabilistic key sharing [2] where larger thresholds result in making both connectivity and compromise harder.

C. Non-ideal Conditions

So far there has been an assumption of the ideal case in which the transmissions at uniformly distributed power levels correspond to uniformly distributed concentric circles, however, this is not true in reality. Next to be seen is the impact of relaxing these assumptions and seeing that the difference is not significant. Two relaxations of these assumptions will now be considered. As part of the first relaxation to be considered is that uniformly distributed power transmissions do not translate into ranges corresponding to uniformly distributed concentric circles. We denote this relaxation as "reala". The second relaxation addresses the fact that the range boundary is typically noncircular. In this case the boundary distance is chosen as a variation from the circular boundary where the variation equals a Gaussian random number whose standard deviation is proportional to $R_{Nc}$ and $1/R_c$, and mean is zero. Combining both the non-uniform increments as represented by the first relaxation and the non-circular range boundary produces a result identified as "realb".

Figure 8:
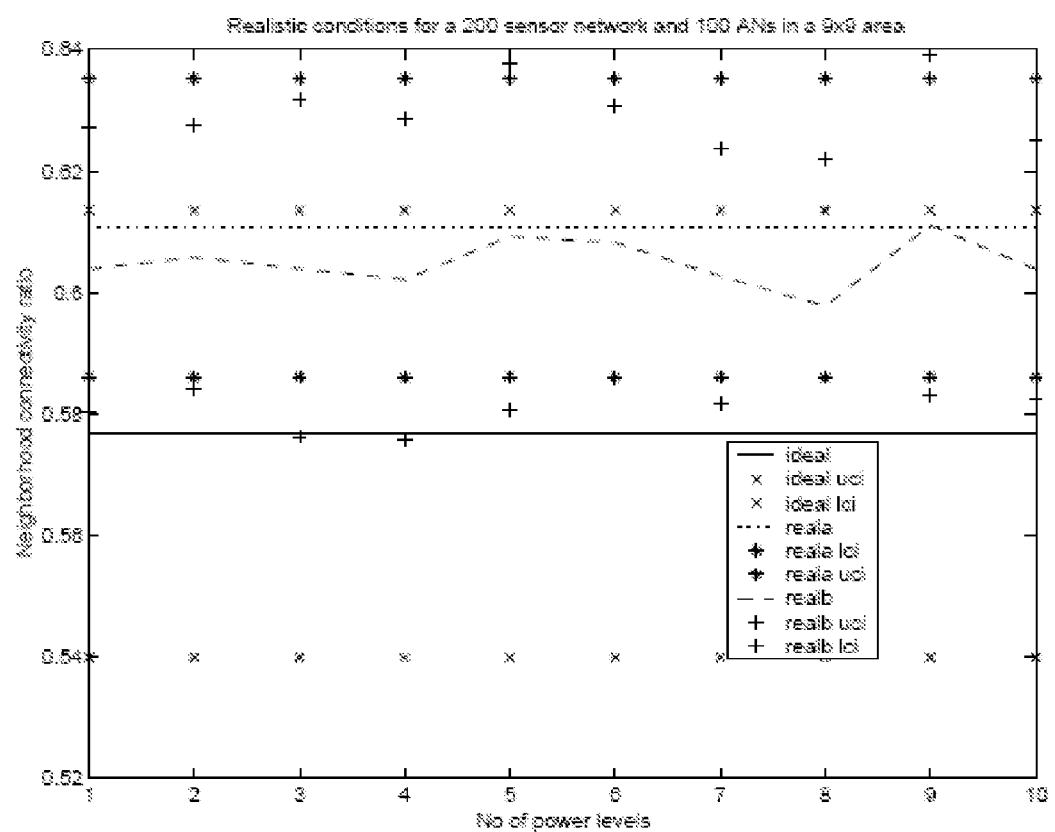
FIG. 8 is a graph of the impact of realistic conditions on connectivity for a 200 sensor network and 100 ANs in a 9×9 area.
Figure 9:
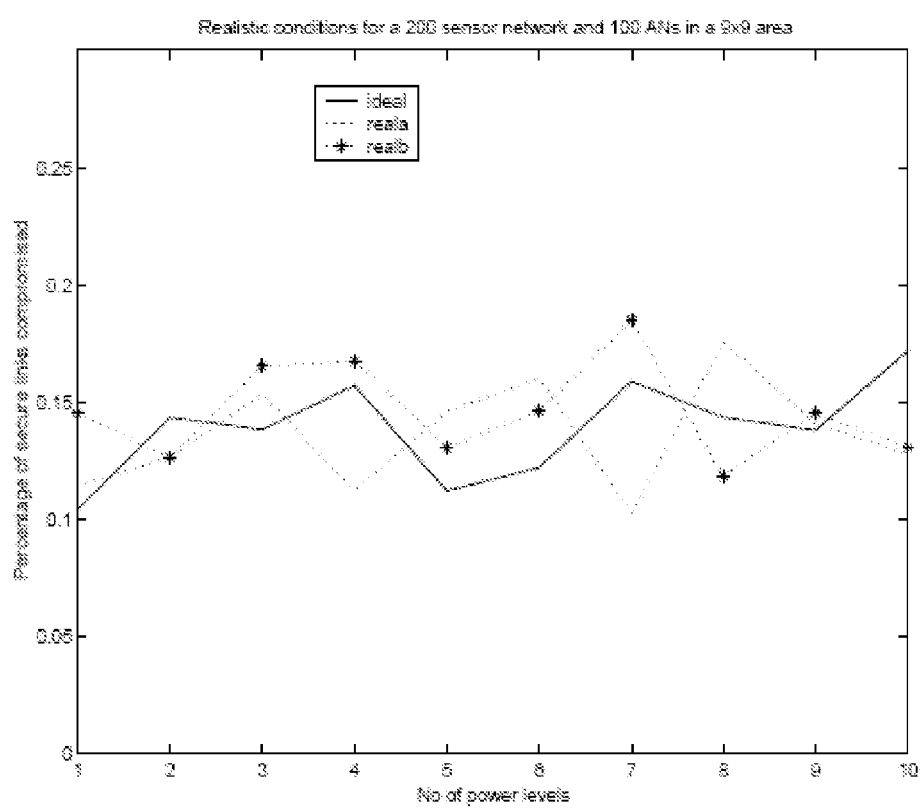
FIG. 9 is a graph of the impact of realistic conditions on node compromise for a 200 sensor network and 100 ANs in a 9×9 area.
Figure 10:
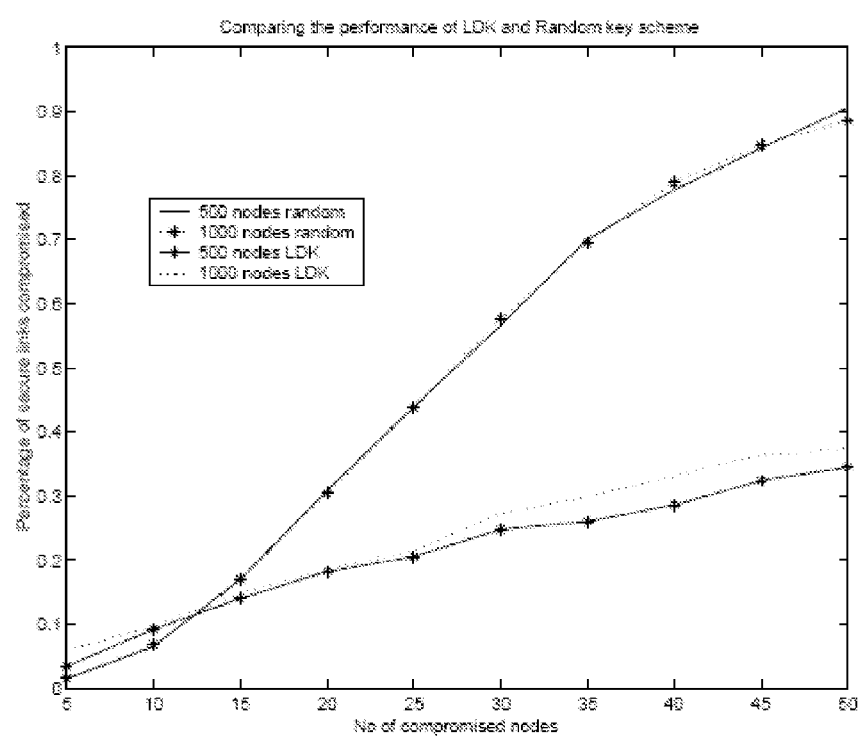
FIG. 10 is a graph comparing the performance of location dependent key management with random key management.
Figure 11:
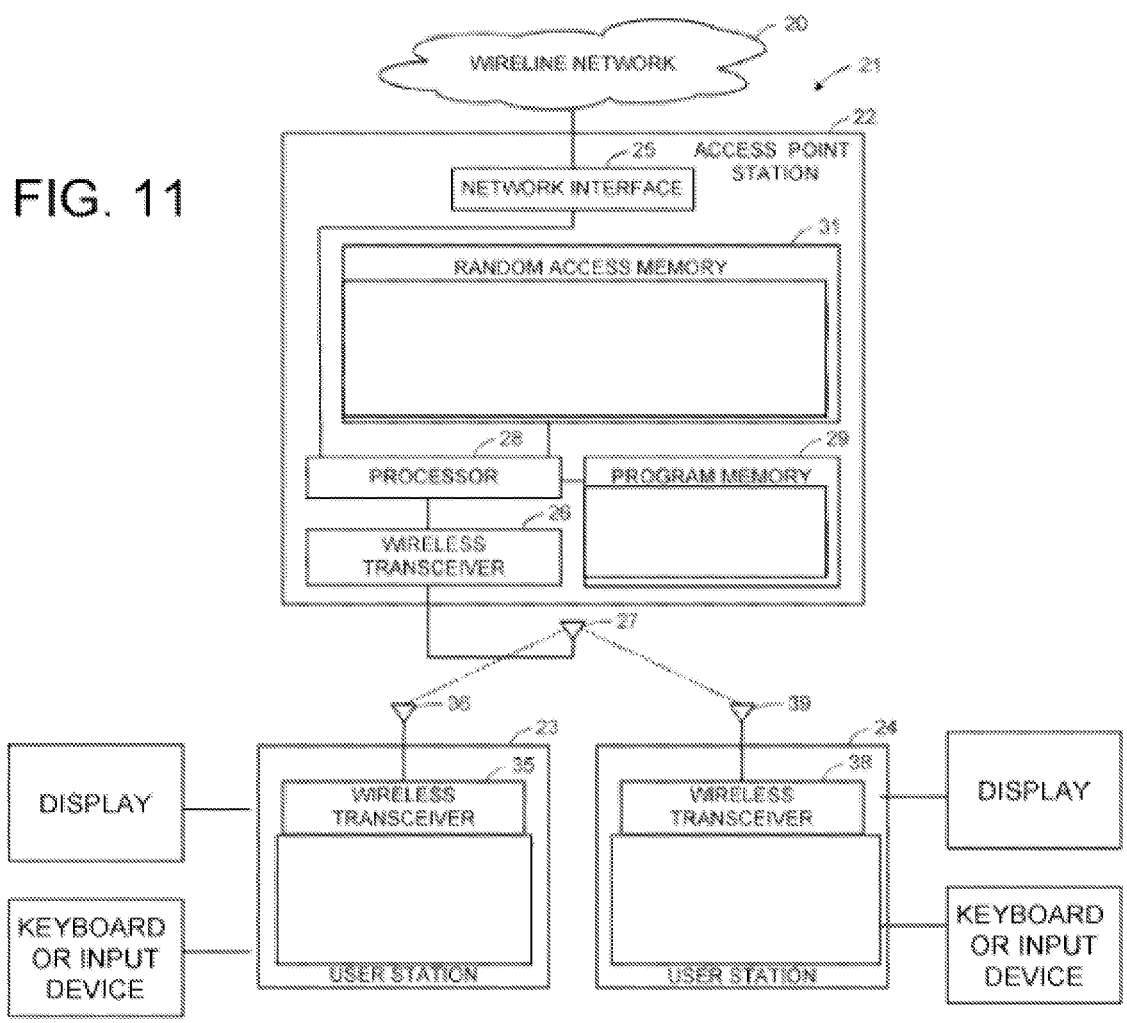
FIG. 11 depicts some illustrative architectural components that can be employed in some illustrative and non-limiting implementations including wireless access points to which client devices communicate.

A comparison of the performance of the ideal case with the two relaxations on a system with 200 sensor nodes and 100 ANs is shown in FIGS. 8 and 9. FIG. 8 shows the connectivity with the ideal, as well as with the two realistic systems. Also shown, are the 95 percent confidence intervals in FIG. 8. Note that the confidence intervals in the other Figures have not been shown in order to enhance clarity. It is seen from FIG. 8 that connectivity ratio is similar in all the three cases. FIG. 10 is a plot of the compromise ratio for these three cases. It is seen that the value of the connectivity ratio is also similar in the three cases. This illustrates that realistic conditions do not impact the performance results.

D. Comparison with Other Systems

The following is a comparison of the performance of LDK with the random key pre-distribution system from reference [6]. For the random key system, it is assumed that there are 1000 keys in the key-ring with every node being loaded with 75 keys before deployment. Given that this system has 1000 possible keys, we select LDK with 200 ANs with five power levels on each AN. This also translates into 1000 possible keys in the system. Also assumed, is that the maximum transmission range of sensor nodes is 0.8 m while $R_{Nc}$ equals 1.0 m for the LDK system.

The performance of both LDK as well as random key systems is shown in FIG. 10. FIG. 10 shows a plot of the number of compromised nodes on the x-axis and the compromise ratio on the y-axis, and shows the performance with both a 1000 node sensor network as well as with a 500 node sensor network. It is seen that in both cases LDK outperforms the random key system when the number of compromised nodes is large. For example, with 10 percent of compromised nodes for a 500 node network, approximately 90 percent of links formed by non-compromised nodes are vulnerable for the random key system with the given parameters. This number reduces dramatically to 35 percent of links compromised with the LDK system. It is also seen from this figure that increasing the density of sensor nodes in the network does not impact the random key system. The impact of increasing the density of sensor nodes on LDK is to increase the compromise ratio slightly, as previously explained.

It is also see from FIG. 10 that the performance of LDK is worse than that of random key systems for very low number of compromised nodes. This is an interesting feature of LDK which is absent in the random key system. This feature is the dependency of LDK on the geographical location. In case of the random key system the adversary does not have to take geography into account while compromising the nodes. Thus, compromise of each node will probabilistically increase the knowledge of keys that the adversary has. Hence, irrespective of the size of the sensor network, the number of nodes compromised determines the compromise ratio of the network. Following the same strategy in case of LDK is not advantageous to the adversary. This is because nodes in the same geographical area contain similar key material. Therefore by compromising nodes in the same geographical area the adversary will not be able to increase the pool of keys under the adversary's control. A better strategy for the adversary in case of LDK, is to focus on compromising nodes in different geographical locations. This will give the adversary access to a wider pool of keys. In many situations the strategy of compromising geographically dispersed nodes would increase the probability of detection for the adversary. Thus, LDK is definitely beneficial in such circumstances.

As a result when a smaller number of nodes are chosen randomly by the adversary to compromise under LDK, such nodes will typically be in non-overlapping regions geographically. Thus, compromise of each such node gives information about new keys to the adversary. But after a threshold, compromise of new nodes does not give as much new information to the adversary since such nodes will be overlapping geographically. With the random key system, compromise of every node chosen randomly increases the knowledge of the adversary by a similar amount. Hence, random key system is beneficial when fewer nodes are compromised while LDK is better when number of nodes that are compromised is large. Thus, for this scenario random key system is better than LDK when the number of compromised nodes is about 12 percent. For number of compromised nodes beyond 2 percent, we see that LDK exhibits better performance.

It should be noted that the connectivity ratio is 1.0 for alt the four cases shown in FIG. 10. Further the avenge number of sub-keys for 1000 nodes is 17 when using LDK for both the 500 node as well as the 1000 node scenario. This is expected since only the density of sensor nodes changes and not the density of ANs which governs the avenge number of sub-keys on each node.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation, a) "means for" or "step for" is expressly recited, b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed, "e.g." which means "for example".

What is claimed is:

1. A system of key management in sensor networks that takes the location of sensor nodes into consideration while deciding which keys are to be deployed on each node, comprising a network, said network having sensor nodes and anchor nodes, each sensor node having a common key and means to derive a plurality of updated keys from said common key after its deployment, said keys derived on each sensor node being dependent said common key and on the location of the sensor node relative to a plurality of anchor nodes.

2. The system of claim 1, wherein each of said anchor nodes have transmission means, each of said transmission means being capable of transmitting a plurality of beacons a plurality of different transmission ranges.

3. The system of claim 2, wherein each of said beacons contains a nonce, wherein each anchor node transmits a plurality of nonces, said sensor nodes having means to receive and store a set of nonces, each sensor node's nonces set being location dependant, whereby sensor nodes in different locations have different nonce sets.

4. The system of claim 3, wherein each sensor node has means to decrypt each beacon and obtain a nonce contained in said beacon and further comprising at least one revocation controller node, said controller sharing a different key with each of a plurality of sensor nodes in said network, said controller node having means to send a key revocation message to an individual sensor node, whereby revocation messages can be restricted to a limited number of compromised nodes in a geographical area.

5. The system of claim 4 wherein each sensor node has means to generate updated keys using a combination of the common key the sensor node's set of nonces, whereby sensor node's updated key are location dependent.

6. A method of location dependent key management in sensor networks, said sensor networks having sensor nodes and anchor nodes, comprising the steps of:
   a) loading each sensor node with a common key prior to deployment,
   b) subsequent to deployment, transmitting to sensor nodes a plurality of beacons at a plurality of different transmission ranges from each anchor node of a plurality of anchor nodes, said beacons containing at least one nonce,
   c) after deployment of at least a plurality of said sensor nodes, deriving a plurality of keys from said common key and the sensor node's nonces, said keys derived on each sensor node being dependent on the location of the sensor node relative to anchor nodes.

7. The method of claim 6, further comprising the step of at least a plurality of sensor nodes receiving and storing a set of nonces, each sensor node receiving nonce containing beacons based on the sensor node's location, whereby sensor nodes in different locations have different nonce sets, and wherein each sensor node derives updated keys using a combination of the common key and its set of nonces.

8. The method of claim 7, further comprising the step of each sensor node decrypting each beacon that it receives and obtaining a nonce contained in each beacon.

9. The method of claim 6, wherein each anchor node transmits a plurality of beacons a plurality of different distance transmission ranges by transmitting at a plurality of different power levels.

10. The method of claim 9, wherein beacons transmitted at different transmission power levels contain different nonces and wherein each sensor node that receives a specific nonce shares a common key with other sensor nodes that receive said nonce.

11. The method of claim 6, wherein a sensor node's ability to receive beacons at a specific transmission range is location dependent.

12. The method of claim 11, wherein a sensor node's ability to receive beacons at a specific range of transmission levels defines its location.

13. The method of claim 6, wherein a sensor node's set of keys is dependant upon the beacons that it receives, and sensor nodes within a specific region will have the same set of nonces, and sensor nodes in adjacent regions share common nonces but also have different nonces.

14. The method of claim 6, wherein sensor nodes that receive the same beacon have a common key for each commonly received beacon.

15. The method of claim 6, further comprising the step of deleting said common key subsequent to generating at least one derived key.

16. The method of claim 15, wherein compromising a sensor node in a network does not comprise sensor nodes in the network that do not share keys with said compromised sensor node.

17. The method of claim 16, wherein sensor nodes that have at least one shared nonce and at least one non-shared nonce are in overlapping but non-coextensive regions.

18. The method of claim 17, wherein sensor nodes in adjacent regions receives different sets of beacons and have shared keys corresponding to each commonly received beacon and non-shared keys corresponding to beacons that are not commonly received.

19. The method of claim 6, further comprising the step of,
   deploying at least one sensor node in a network subsequent to the deployment of other sensor nodes in said network,
   prior to deployment of said subsequently deployed sensor node, loading said subsequently deployed sensor node with said common key,
   subsequent to deployment said subsequently deployed sensor node receiving and storing a plurality of nonce containing beacons transmitted at different transmission levels, and
   deriving a plurality of keys from said common key, said keys derived on each sensor node being dependent on the location of said subsequently deployed sensor node relative to anchor nodes,
   said subsequently deployed sensor node deriving updated keys using a combination of said common key and its set of nonces, whereby said subsequently deployed sensor node shares keys with previously deployed sensor nodes based on a common receipt of beacons, and wherein a controller node shares a different key with each sensor node, and uses said different key to send a revocation message to specific sensor nodes.

20. The method of claim 6, wherein said location dependent key system is combined with a random key system, thereby providing a system that provides the advantages of both systems.

* * * * *

UNITED STATES PATENT AND TRADEMARK OFFICE
CERTIFICATE OF CORRECTION

| | | |
|---|---|---|
| PATENT NO. | : 7,508,788 B2 | |
| APPLICATION NO. | : 11/683312 | |
| DATED | : March 24, 2009 | |
| INVENTOR(S) | : Anjum | |

It is certified that error appears in the above-identified patent and that said Letters Patent is hereby corrected as shown below:

In the Drawings

In Fig. 9, Sheet 9 of 12, delete "condistions" and insert -- conditions --, therefor.

In the Specification

In Column 3, Line 17, delete "antenna," and insert -- antenna; --, therefor.

In Column 3, Line 49, delete "NB;" and insert -- NB: --, therefor.

In Column 4, Line 11, delete "subnet. Then" and insert -- subnet, then --, therefor.

In Column 4, Line 32, delete "stations 23, 25." and insert -- stations 23, 24. --, therefor.

In Column 5, Line 17, delete "and F." and insert -- and E. --, therefor.

In Column 5, Line 51, delete "FR." and insert -- R. --, therefor.

In Column 6, Line 59, delete "link" and insert -- link, --, therefor.

In Column 8, Line 20, delete "as welt" and insert -- as well --, therefor.

In Column 8, Line 64, delete "[12]" and insert -- [12], --, therefor.

In Column 14, Line 19, delete "subregions." and insert -- sub-regions. --, therefor.

In Column 15, Line 28, delete "as welt" and insert -- as well --, therefor.

In Column 16, Line 27, delete "Therefore" and insert -- Therefore, --, therefor.

In Column 16, Line 56, delete "Furthers" and insert -- Further, --, therefor.

In Column 19, Line 1, delete "1.0 m" and insert -- 1.0 m, --, therefor.

In Column 20, Line 10, delete "ANs" and insert -- ANs, --, therefor.

In Column 21, Line 43, delete "descriptions" and insert -- descriptions, --, therefor.

In Column 22, Line 41, delete "$1/R_c$," and insert -- $1/R_c$ --, therefor.

In Column 23, Line 54, delete "12 percent." and insert -- 1-2 percent. --, therefor.

In Column 23, Line 57, delete "for alt" and insert -- for all --, therefor.

Signed and Sealed this
Second Day of December, 2014

Michelle K. Lee
*Deputy Director of the United States Patent and Trademark Office*

In Column 24, Line 17, delete "limitation," and insert -- limitation: --, therefor.

In Column 24, Line 18, delete "recited," and insert -- recited; --, therefor.

In Column 24, Line 36, delete "employed," and insert -- employed: --, therefor.

In the Claims

In Column 24, Line 66, in Claim 5, delete "claim 4" and insert -- claim 4, --, therefor.